United States Patent

Nilsson et al.

(10) Patent No.: US 9,825,781 B2
(45) Date of Patent: Nov. 21, 2017

(54) CHANNEL SPREAD ESTIMATION (71) Applicant: Telefonaktiebolaget L M Ericsson (publ), Stockholm (SE)

(72) Inventors: Thomas Nilsson, Malmö (SE); Niklas Andgart, Södra Sandby (SE); Fredrik Nordström, Lund (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 117 days.

(21) Appl. No.: 14/410,128

(22) PCT Filed: Jun. 24, 2013

(86) PCT No.: PCT/EP2013/063135
§ 371 (c)(1),
(2) Date: Dec. 22, 2014

(87) PCT Pub. No.: WO2014/001254
PCT Pub. Date: Jan. 3, 2014

(65) Prior Publication Data
US 2015/0207646 A1    Jul. 23, 2015

Related U.S. Application Data (60) Provisional application No. 61/666,986, filed on Jul. 2, 2013.

(30) Foreign Application Priority Data

Jun. 28, 2012  (EP) .................................. 12174103

(51) Int. Cl.
H04L 25/02    (2006.01)
H04W 24/10    (2009.01)
(Continued)

(52) U.S. Cl.
CPC ........ H04L 25/0202 (2013.01); H04L 5/0053 (2013.01); H04L 25/022 (2013.01);
(Continued)

(58) Field of Classification Search
None
See application file for complete search history.

(56) References Cited

U.S. PATENT DOCUMENTS

2005/0041622 A1* 2/2005 Dubuc .................. H04L 1/0026
370/332
2005/0135324 A1* 6/2005 Kim ........................ H04L 1/005
370/343
(Continued)

FOREIGN PATENT DOCUMENTS

EP    1675335 A1    12/2004
EP    2045940 A1    4/2009
(Continued)

OTHER PUBLICATIONS

3GPP, "3rd Generation Partnership Project; Technical Specification Group Radio Access Network; Evolved Universal Terrestrial Radio Access (E-UTRA); Physical layer procedures (Release 10)", 3GPP TS 36.213 V10.4.0, Dec. 2011, 1-125.
(Continued)

*Primary Examiner* — Huy D Vu
*Assistant Examiner* — James P Duffy
(74) *Attorney, Agent, or Firm* — Murphy, Bilak & Homiller, PLLC (57) ABSTRACT

There is provided a method of estimating channel spread at a receiver of a user equipment, UE, for one antenna port of a network node. The method is performed in the UE. The method comprises acquiring channel estimates for one antenna port of a network node. The method further comprises determining a variation of acquired channel estimates
(Continued)

representing subframes associated with a common precoder, the subframes comprising resource blocks scheduled to the UE. The method further comprises estimating the channel spread by using a pre-determined mapping from the determined variation to a channel spread value. A user equipment and a computer program are also provided.

15 Claims, 5 Drawing Sheets

(51) Int. Cl.
    *H04W 72/04*     (2009.01)
    *H04L 5/00*     (2006.01)

(52) U.S. Cl.
    CPC ......... *H04L 25/0212* (2013.01); *H04W 24/10* (2013.01); *H04W 72/0453* (2013.01); *H04L 5/0023* (2013.01)

(56) References Cited

U.S. PATENT DOCUMENTS

| | | | |
|---|---|---|---|
| 2006/0227887 A1* | 10/2006 | Li | H04L 25/0232 375/260 |
| 2008/0051125 A1 | 2/2008 | Muharemovic et al. | |
| 2009/0185602 A1* | 7/2009 | Atarashi | H04B 1/7103 375/141 |
| 2009/0279419 A1* | 11/2009 | To | H04L 1/0026 370/208 |
| 2011/0255505 A1* | 10/2011 | Liu | H04L 5/0007 370/330 |
| 2012/0045995 A1 | 2/2012 | Nakano et al. | |
| 2013/0163530 A1* | 6/2013 | Chen | H04W 72/04 370/329 |

FOREIGN PATENT DOCUMENTS

| | | |
|---|---|---|
| EP | 2071784 A1 | 6/2009 |
| EP | 2182690 A1 | 5/2010 |
| GB | 2479658 A | 10/2011 |
| WO | 2006111276 A1 | 10/2006 |
| WO | 2011156939 A1 | 12/2011 |

OTHER PUBLICATIONS

Choi, Ji-Woong, "Low-complexity Mean Delay Estimation for OFDM Systems", IEEE Transactions on Vehicular Technology, vol. 58, Issue 7, 2009, 3790-3795.

Nam, Young-Han et al., "Evolution of Reference Signals for LTE-Advanced Systems", IEEE Communications Magazine, Feb. 2012, 132-138.

Ramasubramanian, Karthik et al., "An OFDM Timing Recovery Scheme with Inherent Delay-Spread Estimation", IEEE Global Telecommunications Conference, 2001, San Antonio, Texas, USA, Nov. 25-29, 2001, 3111-3115.

Rohde, Christian et al., "Low Complexity Block Processing Algorithms for Adaptive Channel Estimation in OFDM Systems", 2010 IEEE Global Telecommunications Conference, 2010, 1-6.

Unknown, Author, "Discussion on quasi co-located antennas", Ericsson, ST-Ericsson, 3GPP TSG-RAN WG4 #63, R4-122702, Prague, Czech Republic, May 21-25, 2012, 1-8.

Wen, Jyh-Horng, "Timing and Delay Spread Estimation Scheme in OFDM Systems", IEEE Transactions on Consumer Electronics, vol. 54, No. 2, May 2008, 316-320.

Yücek, Tevfik et al., "Time Dispersion and Delay Spread Estimation for Adaptive OFDM Systems", IEEE Transactions on Vehicular Technology, vol. 57, No. 3, May 2008, 1715-1722.

\* cited by examiner

CHANNEL SPREAD ESTIMATION

TECHNICAL FIELD

Embodiments presented herein relate to channel spread estimation, and particularly to a method, a user equipment and a computer program for estimation of channel spread at the user equipment in a mobile communication network.

BACKGROUND

In mobile communication networks, there is always a challenge to obtain good performance and capacity for a given communications protocol, its parameters and the physical environment in which the mobile communication network is deployed.

The evolution of the Universal Mobile Telecommunications Standard Long Term Evolution (UMTS LTE) for mobile communications continues with new features to increase the overall capacity and to increase the general performance of the communications network. Coordinated Multi-point transmission/reception (CoMP) is one concept that was first introduced in Release 10 of LTE. In CoMP, UEs (user equipment, which in LTE is the terminology for the mobile communication terminals) can receive coordinated data transmissions from multiple sectors or cells.

In CoMP scenarios, it may be advantageous to map transmitter (TX) antenna ports of the network node to geographically separated antennas at different transmission points (TPs) within a cell of the base. Commonly there may be in the order of 1 to 8 antenna ports. The antenna ports are then geographically non-co-located, meaning that each antenna port may have different channel properties, like delay spread, Doppler spread, signal-to-noise ratio (SNR) and frequency offset.

A UE may thus face new challenges when receiving data transmissions from non-co-located antenna ports. In principle, the UE cannot assume antenna ports to be co-located and should hence estimate the channel properties separately for each antenna port.

Existing solutions to estimate the channel properties, e.g. the delay spread, are mainly based on the Cell Reference Symbols (CRS) and use a large number of samples (channel estimates) in time and frequency to give reliable estimates of the channel properties. Averaging over CRS ports may then be used to further improve the estimates.

However, there is still a need for an improved estimation of channel properties.

SUMMARY

An object of embodiments herein is to provide estimation of channel spread, e.g. delay spread and/or Doppler spread, at a user equipment.

The inventors of the enclosed embodiments have through a combination of practical experimentation and theoretical derivation discovered that one problem with non-co-located antenna ports is that a very limited number of channel estimates will be available for estimating the channel properties for each antenna port. This may severely influence the quality of the estimates at the corresponding receiver.

Existing solutions like zero or level crossing algorithms, for example as disclosed in EP2071784 or EP1675335, require a large number of channel estimates to give a reliable estimate of the delay spread. These algorithms are also very sensitive to noise. Alternative solutions based on computing the RMS delay spread from the Channel Impulse Response (CIR) require a large number of channel estimates in the frequency domain to get a reliable CIR in the time domain. These methods make use of the computationally costly inverse FFT (Fast Fourier Transform). Filtering of the CIR in the time domain may be used to further improve the estimates. Previous methods are not considered efficient and/or reliable enough when it comes to situations with a very limited number of channel estimates.

A particular object is therefore to provide estimation of channel spread at a receiver of the UE for one transmitting antenna port.

According to a first aspect there is presented a method of estimating channel spread at a receiver of a user equipment, UE, for one antenna port of a network node. The method is performed in the UE. The method comprises acquiring channel estimates for one antenna port of a network node. The method further comprises determining a variation of acquired channel estimates representing subframes associated with a common precoder, the subframes comprising resource blocks scheduled to the UE. The method further comprises estimating the channel spread by using a predetermined mapping from the determined variation to a channel spread value.

Advantageously the method produces reliable estimates of the channel spread with a very limited number of channel estimates. The performance of the method is similar to legacy methods that require a larger number of channel estimates and more computational complexity, e.g. the use of the inverse FFT.

According to embodiments the channel spread is delay spread. The variation of channel estimates may then be determined as variation over frequency of the channel estimates.

The variation of channel estimates is associated with one or more frequency bands. Each frequency band may be associated with a range of subcarriers.

According to embodiments the channel spread is Doppler spread. The variation of channel estimates may then be determined as variation over time of the channel estimates.

The variation may be determined from at least two channel estimate variations. Both the at least two channel estimate variations are associated with the subframes.

The channel estimate variations may be filtered to obtain an average variation. The determined variation may thus be an average of the at least two channel estimate variations.

The mapping may be a function of signal to noise and interference ratio (SNR) at the receiver for the transmitting antenna port. The signal to noise and interference ratio may be determined from the acquired channel estimates. The SNR estimation (and compensation) may advantageously be performed to determine how much of the observed variation that is due to noise and not due to channel spread. The SNR compensation is thus advantageously made when completing the mapping to avoid bias (e.g., due to noise that is interpreted in the receiver as frequency selectivity) in the channel spread estimation.

The channel estimates may be part of one precoding resource block group, PRG. The variation determination considers only those parts of the channel estimates which represent pilot symbols. In some embodiments, the pilot symbols are demodulation reference symbols, DM-RS.

The variation may be determined from at least one second order statistics determination of the channel estimates.

According to a second aspect there is presented a user equipment, UE, for estimating channel spread at a receiver of the UE for one antenna port of a network node. The UE comprises a processing unit arranged to acquire channel estimates for one antenna port of a network node. The processing unit is further arranged to determine a variation of acquired channel estimates representing subframes associated with a common precoder, the subframes comprising resource blocks scheduled to the UE. The processing unit is further arranged to estimate the channel spread by using a pre-determined mapping from the determined variation to a channel spread value.

According to a third aspect there is presented a computer program of estimating channel spread at a receiver of a user equipment, UE, for one antenna port of a network node, the computer program comprising computer program code which, when run on a UE, causes the UE to perform a method according to the first aspect.

According to a fourth aspect there is presented a computer program product comprising a computer program according to the third aspect and a computer readable means on which the computer program is stored.

It is to be noted that any feature of the first, second, third and fourth aspects may be applied to any other aspect, wherever appropriate. Likewise, any advantage of the first aspect may equally apply to the second, third, and/or fourth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
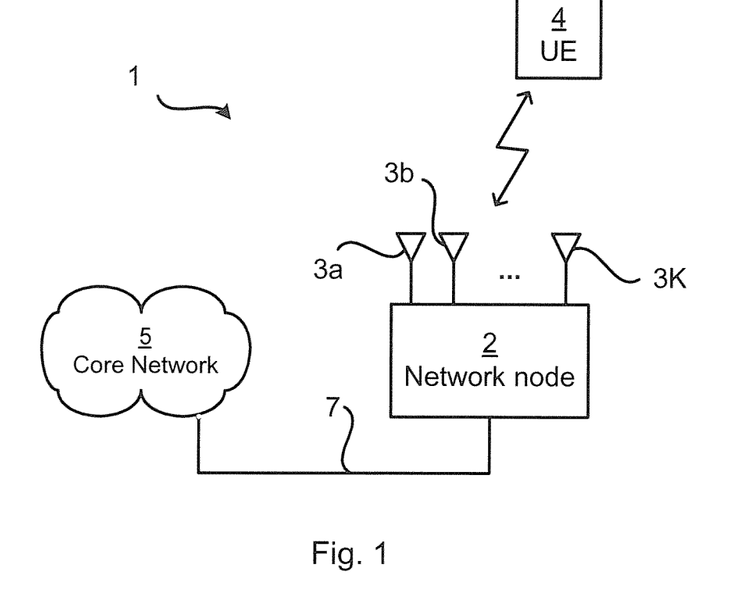
FIG. 1 is a schematic diagram illustrating a mobile communication network where embodiments presented herein may be applied.

FIG. 1 is a schematic diagram illustrating a mobile communication network 1 where embodiments presented herein can be applied. The mobile communications network comprises a network node 2 and a user equipment (UE) 4. Generally, the network node 2 provides radio connectivity to a plurality of UE 4. The term UE is also known as mobile communication terminal, mobile terminal, user terminal, user agent, or other wireless device etc. The communication between the UE 4 and the network node 2 occurs over a wireless radio interface.

The mobile communication network 1 may generally comply with the LTE standard. The mobile communication network 1 is the evolved UMTS Terrestrial Radio Access Network (E-UTRA) in one embodiment. Typically the E-UTRA network consists only of network nodes 2 in the form of eNBs (E-UTRAN NodeB, also known as Evolved NodeB) on the network side. The eNB is the hardware that is connected to the core network 5 and that communicates directly with the UE 4. Several eNBs may typically connected to each other via the so-called X2 interface, and they connect to the packet switched (PS) core network 5 via the so-called S1 interface (as illustrated by reference numeral 7). The network node 2 generally comprises a number of antenna ports K associated to a precoder with a number K of antenna elements 3a, 3b, 3K (thus one antenna port corresponds to one or more antenna elements via a mapping. One port can further be a linear combination of one or more antenna elements).

Figure 5:
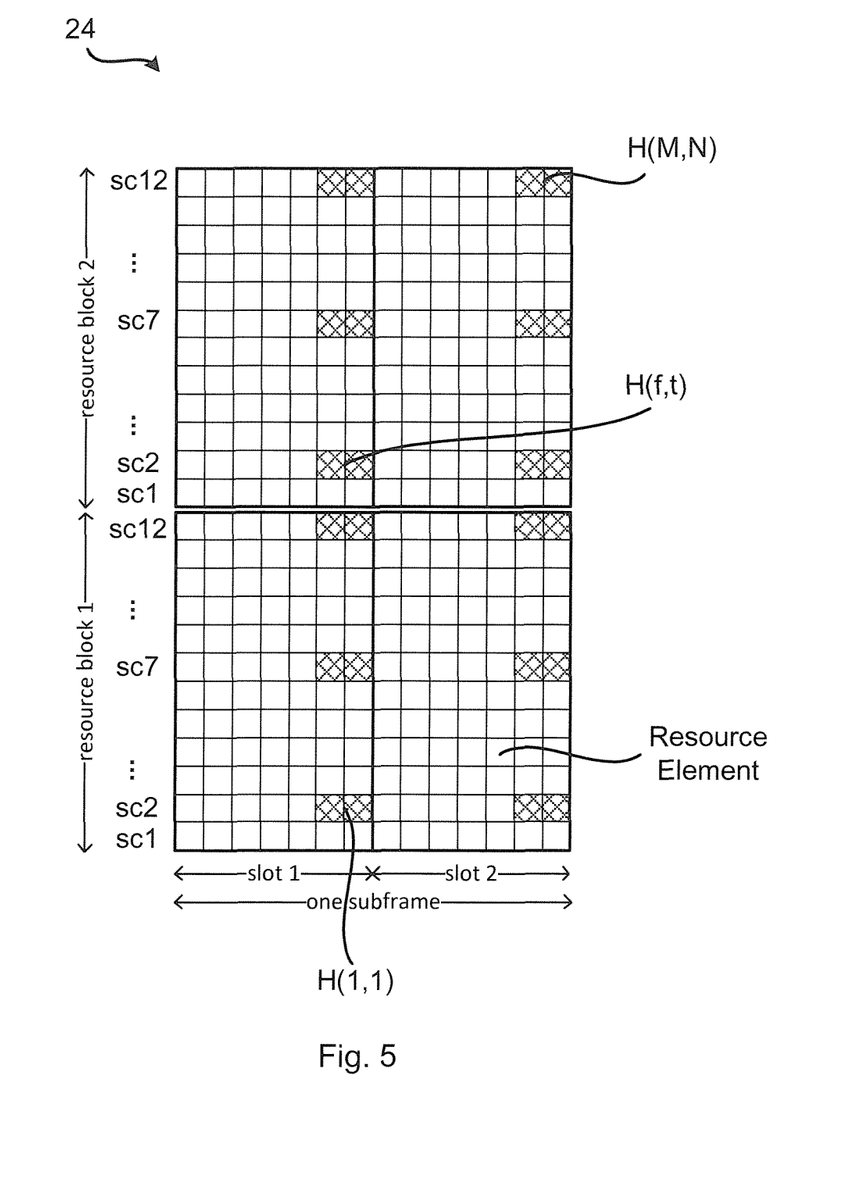
FIG. 5 illustrates a time-frequency grid representing a downlink physical resource.

LTE uses orthogonal frequency-division multiplexing (OFDM) for the downlink transmission (i.e. from network node to UE) and DFT-spread OFDM for the uplink transmission (i.e. from UE to network node). The basic LTE downlink physical resource can thus be seen as a time-frequency grid as illustrated in FIG. 5 where each resource element corresponds to one OFDM subcarrier during one OFDM symbol interval.

In the time domain, LTE downlink transmissions are organized into radio frames of 10 ms, each radio frame comprising ten equally-sized subframes of length T=1 ms.

Furthermore, the resource allocation in LTE is typically described in terms of resource blocks (RB), where a resource block corresponds to one slot (0.5 ms) in the time domain and 12 contiguous subcarriers sc1-sc12 in the frequency domain. FIG. 5 illustrates at reference numeral 24 two resource blocks in the frequency dimension and two resource blocks in the time dimension for one subframe. A pair of two adjacent resource blocks in time direction (1.0 ms) is known as a resource block pair.

A resource block pair comprising two Physical Resource Blocks (PRB), where each PRB typically comprises 12 subcarriers and lasts for one slot (0.5 msec) is the smallest unit of resources that can be allocated to a UE. In Transmission mode 9 of LTE, Precoding Resource Block Group (PRG) defines a set of PRBs where the same precoder is used. The frequency size of the PRG ranges from 1-3 depending on the system bandwidth, see 3GPP TS 36.213 V10.4.0.

Different precoders may be used by the network node for each PRG allocated to a UE. This implies that the delay spread might be different for neighboring PRGs. Furthermore, neighboring PRGs can be transmitted from non-co-located antennas resulting in different delay spreads. The transmission point in time may also change between PRGs. The UEs should under these circumstances advantageously estimate the delay spread independently for each PRG.

Downlink transmissions are dynamically scheduled, i.e., in each subframe the network node transmits control information about to which terminals data is transmitted and upon which resource blocks the data is transmitted, in the current downlink subframe. This control signalling is typically transmitted in the first 1, 2, 3 or 4 OFDM symbols in each subframe and is known as the Control Format Indicator (CFI). The downlink subframe also contains common reference signals (CRS), which are known to the receiver (i.e. the UE) and used for coherent demodulation of e.g. the control information.

Different Reference Signals (RS) may be used for estimating the channel properties, like the Cell-specific RS (CRS), the Demodulation RS (DM-RS) and the Channel State Information RS (CSI-RS). Each RS is mapped to a TX antenna port.

The CRS are transmitted in every downlink resource block and cover the entire cell bandwidth. The CRS can be used for coherent demodulation of all downlink physical channels except for the PMCH (Physical Multicast Channel) and for the PDSCH (Physical Downlink Shared Channel) in case of transmission mode 7, 8 and 9. DM-RS are UE specific reference signals intended to be used for channel estimation for PDSCH in transmission mode 7, 8 and 9. The DM-RS are typically only transmitted within the resource blocks assigned to the specific UE. In the illustration of FIG. 5 DM-RS resource element pairs H(f, t) (the hatched elements) are associated with subcarriers sc2, sc7 and sc12 in each resource block.

In a typical scenario, the CRS may be transmitted from a TP of a macro cell while the DM-RS are transmitted from a TP of one or several micro or pico cells. Each DM-RS port may then be regarded as non-co-located.

The embodiments disclosed herein relate to estimation of channel spread at a receiver of the UE for one antenna port at a network node. In order to obtain estimation of channel spread for one antenna port at a receiver of the UE there is provided a method performed in the UE, a computer program comprising code, for example in the form of a computer program product, that when run on a UE, causes the UE to perform the method.

Figure 2:
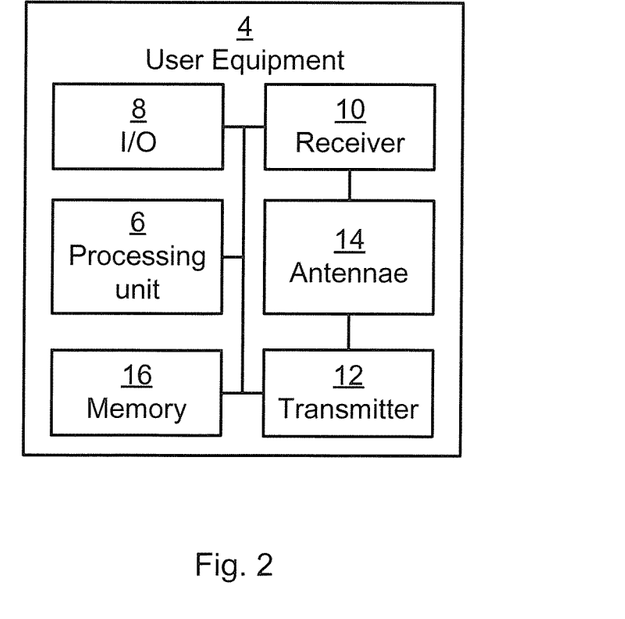
FIG. 2 is a schematic diagram showing functional modules of a user equipment.

FIG. 2 schematically illustrates, in terms of a number of functional modules, the components of a UE 4. A processing unit 6 is provided using any combination of one or more of a suitable central processing unit (CPU), multiprocessor, microcontroller, digital signal processor (DSP), application specific integrated circuit (ASIC) etc., capable of executing software instructions stored in a computer program product 18 (as in FIG. 3), e.g. in the form of a memory 16. Thus the processing unit 6 is thereby arranged to execute methods as herein disclosed. The memory 16 may also comprise persistent storage, which, for example, can be any single one or combination of magnetic memory, optical memory, solid state memory or even remotely mounted memory. The UE 4 may further comprise an input/output (I/O) interface 18 for receiving and providing information to a user interface. The UE 4 also comprises one or more transmitters 12 and receivers 10, comprising analogue and digital components forming the functionalities of a transmitter and a receiver, and a suitable number of antennae 14 for radio communication with the network node 2. The processing unit 6 controls the general operation of the UE 4, e.g. by sending control signals to the transmitter 12 and/or receiver 10 and receiving reports from the transmitter 12 and/or receiver 10 of its operation. Other components, as well as the related functionality, of the network UE 4 are omitted in order not to obscure the concepts presented herein.

Figure 3:
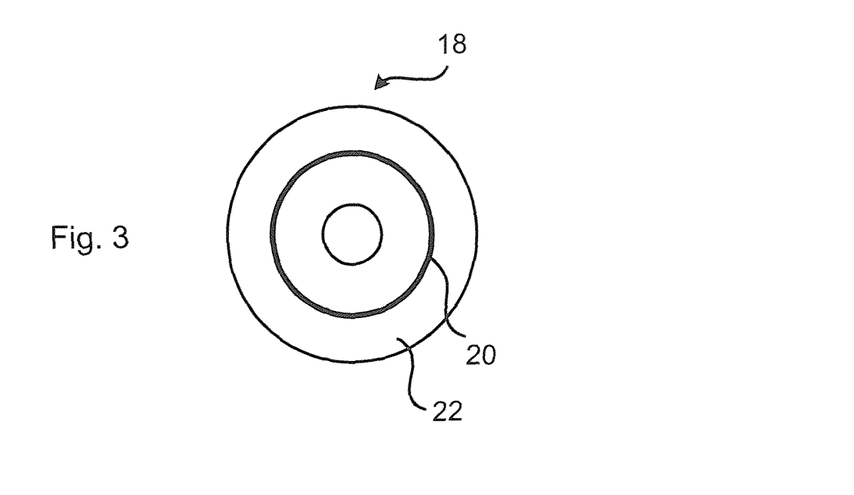
FIG. 3 shows one example of a computer program product comprising computer readable means.
Figure 4:
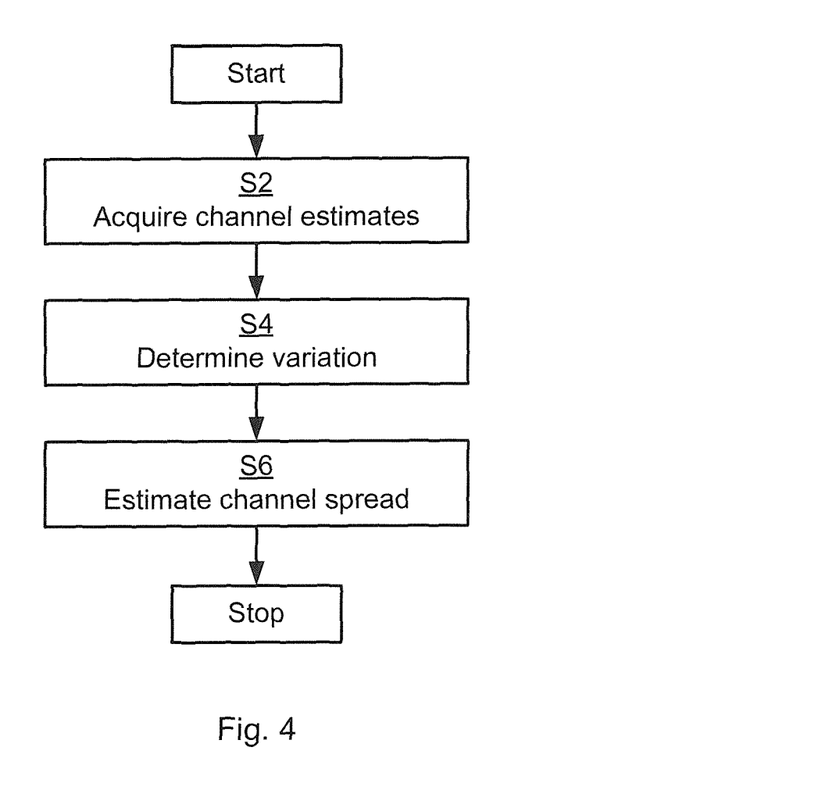
FIG. 4 is a flowchart of a method according to embodiments.

FIG. 4 is flow chart illustrating embodiments of methods of estimating channel spread at a receiver 10 of a UE 4 for one antenna port 3a, 3b, 3K at a network node 2. The methods are performed in the UE 4. The methods are advantageously provided as computer programs 20. FIG. 3 shows one example of a computer program product 18 comprising computer readable means 22. On this computer readable means 22, a computer program 20 can be stored, which computer program 20 can cause the processing unit 6 and thereto operatively coupled entities and devices, such as the memory 16, the I/O interface 8, the transmitter 12, the receiver 10 and/or the antennae 14 to execute methods according to embodiments described herein. In the example of FIG. 3, the computer program product 18 is illustrated as an optical disc, such as a CD (compact disc) or a DVD (digital versatile disc) or a Blu-Ray disc. The computer program product could also be embodied as a memory (RAM, ROM, EPROM, EEPROM) and more particularly as a non-volatile storage medium of a device in an external memory such as a USB (Universal Serial Bus) memory. Thus, while the computer program 20 is here schematically shown as a track on the depicted optical disk, the computer program 20 can be stored in any way which is suitable for the computer program product 18.

The enclosed embodiments are based on determining an estimate of the delay spread by using the limited number of channel estimates found in one PRG. In brief, the estimation may be accomplished by determining the variation of the channel estimates in the frequency direction for a number of slots containing pilots in the frequency direction. An average may then be determined based on two or more samples of the variation. A mapping table (e g. a look-up table) or mapping function may then be used to map the determined variation to specific values of the delay spread in dependence of a SNR value.

Returning now to FIG. 4, during a step S2 channel estimates H for one antenna port of the network node 2 (such as an eNB) is acquired. The channel estimates H are acquired by the processing unit 6 of the UE 4. Let H(p,f,t) denote the channel estimate for antenna port p of the network node 2, subcarrier f and symbol t. The channel estimates are part of one precoding resource block. group, PRG.

In a step S4 a variation of acquired channel estimates representing a limited number of subframes is determined. The variation is determined by the processing unit 6 of the UE 4. The limited number of subframes may be defined as subframes being associated with a common precoder. According to another embodiment the precoder is defined by a unity matrix, reflecting a case when a precoder is not used. The subframes generally comprise resource blocks scheduled to the UE.

According to one embodiment the variation is determined from at least two channel estimate variations. Both the at least two channel estimate variations may be associated with the subframes. The variation for antenna port p (for the example assumption that f and t only span the pilot positions within the PRB Group) may be determined, for example, from an average of the at least two channel estimate variations. The variation determination thus considers only those parts of the channel estimates which represent pilot symbols. In general terms the channel estimates are based on pilots or other known signals, or even generated from the data transmission. The pilot symbols are demodulation reference symbols, DM-RS, in some embodiments.

Firstly, consider a case where the channel spread represents delay spread. The variation may then be determined as variation over frequency of the channel estimates. The variation may be associated with one or more frequency bands, each frequency band being associated with a range of subcarriers (in FIG. 5: sc2, sc7, sc12). The range of subcarriers may be associated with a resource block, RB.

In general terms the variation used to determine the channel spread for antenna port p may be determined from at least one second order statistics determination of the channel estimates. The second order statistics may for example be represented by a standard deviation or a variance function.

According to a first example the variation is determined from a standard deviation determination of the channel estimates. Thus, in pseudo-code:

$$S_{p,t}=\text{sdev}(\{H(p,f,t),f=1,2,\ldots,M\}),t=1,2,\ldots,N,$$

where 'sdev' denotes the standard deviation operator, where M is the largest subcarrier within the PRB group that contains pilots and where N is the last symbol within the PRB Group that contains pilots.

According to a second example the variation is determined from a standard deviation determination of the matrix product of H and H*. Thus, in pseudo-code:

$$S_{p,t}=\text{sdev}(\{H(p,f,t)H(p,f+1,t)^{*},f=1,2,\ldots,M-1\}),t=1,2,\ldots,N.$$

According to a third example the variation is determined from a standard deviation determination of the absolute value, 'abs', of a higher order moment k of the channel estimates. Thus, in pseudo-code:

$$S_{p,t}=\text{sdev}(\{\text{abs}(H(p,f,t))^{k},f=1,2,\ldots,M\}),t=1,2,\ldots,N.$$

According to a fourth example the variation is determined from a standard deviation determination of the argument or phase, 'arg', of the channel estimates. Thus, in pseudo-code:

$$S_{p,t}=\text{sdev}(\{\arg(H(p,f,t)),f=1,2,\ldots,M\}),t=1,2,\ldots,N.$$

The two or more estimates $S_{p,t}$ may then be filtered to determine an averaged estimation $S_p$.

According to a first example the averaged estimation $S_p$ is determined by averaging $S_{p,t}$ over time. Thus, in pseudo-code:

$$S_p=\text{mean}(\{S_{p,t},t=1,2,\ldots,N\}),$$

where 'mean' denotes the mean value operator.

According to a second example the averaged estimation $S_p$ is determined by determining a weighted sum of $S_{p,t}$ over time. Thus, in pseudo-code:

$$S_p=\text{sum}(\{c_{p,t}\cdot S_{p,t},t=1,2,\ldots,N\}),$$

where $c_{p,t}$ denotes general weights for antenna port p at time t. Generally, all $c_{p,t}>0$ and all $c_{p,t}$ sum up to 1.

Secondly, consider a case where the channel spread represents Doppler spread. In general terms, Doppler spread is a property describing how much the channel phases varies over time, and is directly dependent on the speed at which the UE 4 is moving. The Doppler spread affects e.g. how much filtering that can be performed in the time direction. The variation may then be determined as variation over time of the channel estimates.

In general terms, similar to the variation used to determine the delay spread, the variation used to determine the Doppler spread may be determined from at least one second order statistics determination of the channel estimates.

Estimation of the Doppler spread may generally be obtained in similar ways as the estimation of the delay spread. Estimation of the Doppler spread may for example be obtained by determining the variation in the time direction instead of in the frequency direction (as above).

Thus, in comparison to the above first example, the variation is determined from a standard deviation determination of the channel estimates. Thus, in pseudo-code:

$$S_{p,f}=\text{sdev}(\{H(p,f,t),t=1,2,\ldots,N\}),f=1,2,\ldots,M.$$

The variation may likewise be determined in accordance with the above disclosed second, third, or fourth examples.

The two or more estimates $S_{p,f}$ may then be filtered to determine an averaged estimation $S_p$. Thus, in pseudo-code:

$$S_p=\text{mean}(\{S_{p,f},f=1,2,\ldots,M\}).$$

The estimation $S_p$ may also be determined from a weighted sum of $S_{p,f}$ over frequency.

In a step S6 the channel spread is estimated by using a pre-determined mapping from the determined variation to a channel spread value. The channel spread value thus represents either a delay spread $T_p$ or a Doppler spread $f_p$. The channel spread is estimated by the processing unit 6 of the UE 4.

Thus, to obtain an estimate of the delay spread $T_p$ a mapping table or a mapping function is used. As an example the mapping may be performing a table look-up operation based on $S_p$ (for the delay spread). Thus, in pseudo-code:

$$T_p=\text{lookup}_{Tp}(S_p).$$

Likewise, to obtain an estimate of the Doppler spread $f_p$ a table look-up operation based on $S_p$ (for the Doppler spread) is performed. Thus, in pseudo-code:

$$f_p=\text{lookup}_{fp}(S_p).$$

Figure 6:
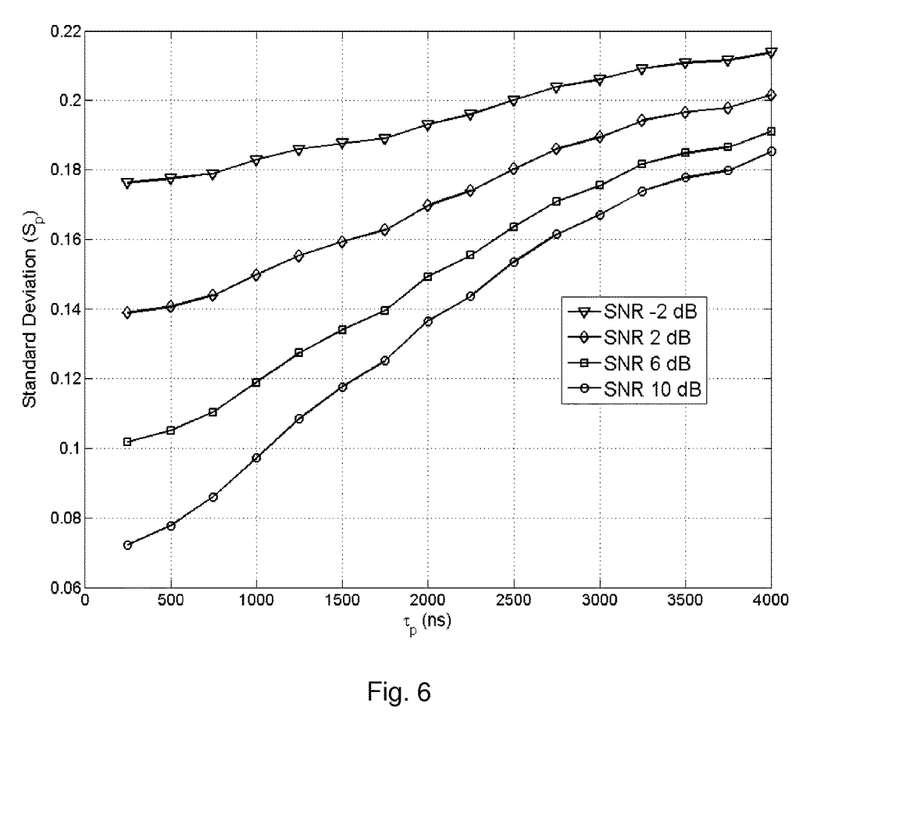
FIG. 6 illustrates a relationship between channel estimation variation and delay spread.

A mapping table or a mapping function is used for the mapping. The mapping table or mapping function describes the relationship between the variation and the channel spread. In particular there may be one mapping table from the variation to the delay spread and another mapping table from the variation to the Doppler spread. An illustration of the relationship between the variation and the delay spread is illustrated in FIG. 6.

The mapping may be pre-calculated and stored, for example as one or more mapping tables in the memory 16. The mapping can also be implemented by a suitable mapping function, e.g., with a polynomial approximation. The values of the mapping may be generated in multiple ways. Computer simulations can be used to determine the values of the mapping, for example by estimating the variation in simulation scenarios with known signal-to-noise ratios and delay spread (or Doppler spread). Controlled field tests with known propagation condition can also be used to derive the values of the mapping.

As foreshadowed above the mapping is, according to an embodiment, a function of signal to noise and interference ratio $\gamma_p$ at the receiver for the antenna port p. In an embodiment, the signal to noise and interference ratio is determined from the acquired channel estimates.

The SNR can be obtained in a number of different ways. For example the SNR can be estimated by first determining $$H_{avg}(p)=\text{sum}(H(p,f,t),t=1,\ldots,N,f=1,\ldots,M)/(M*N),$$

where $H_{avg}(p)$ is the average of the channel estimate H, and then determining $$\sigma^2(p)=\text{sum}(\text{abs}(H(p,f,t)-H_{avg}(p))2,t=1,\ldots,N,f=1,\ldots,M)/(M*N),$$

where $\sigma^2(p)$ is the variance of the of the channel estimate H.

The SNR parameter $\gamma_p$ can then be approximated by the estimate SNR$_{est}$ where:

$$SNR_{est} = abs(H_{avg}(p))^2/\sigma^2(p).$$

Other examples to obtain the SNR include for example to use the CRS based channel estimates and the residuals from the same. Another alternative can be to use the DMRS based channel estimates from one or more previous subframes and their residuals.

To obtain an estimate of the delay spread $T_p$ a table look-up operation based on Sp (for the delay spread) and $\gamma_p$ may then be performed. Thus, in pseudo-code:

$$T_p = lookup_{Tp}(S_p, \gamma_p).$$

Likewise, to obtain an estimate of the Doppler spread $f_p$ a table look-up operation based on $S_p$ (for the Doppler spread) and $\gamma_p$ may then be. Thus, in pseudo-code:

$$f_p = lookup_{fp}(S_p, \gamma_p).$$

The estimated variation may generally be biased by the noise and for low SNRs the noise will be dominant over the variation caused by the delay spread. FIG. 6 illustrates the measured standard deviation ($S_p$) as function of $T_p$ (the length of the channel impulse response) for different SNRs. The variation is a linear function of $T_p$ but with a decreasing gradient for lower SNRs.

Figure 7:
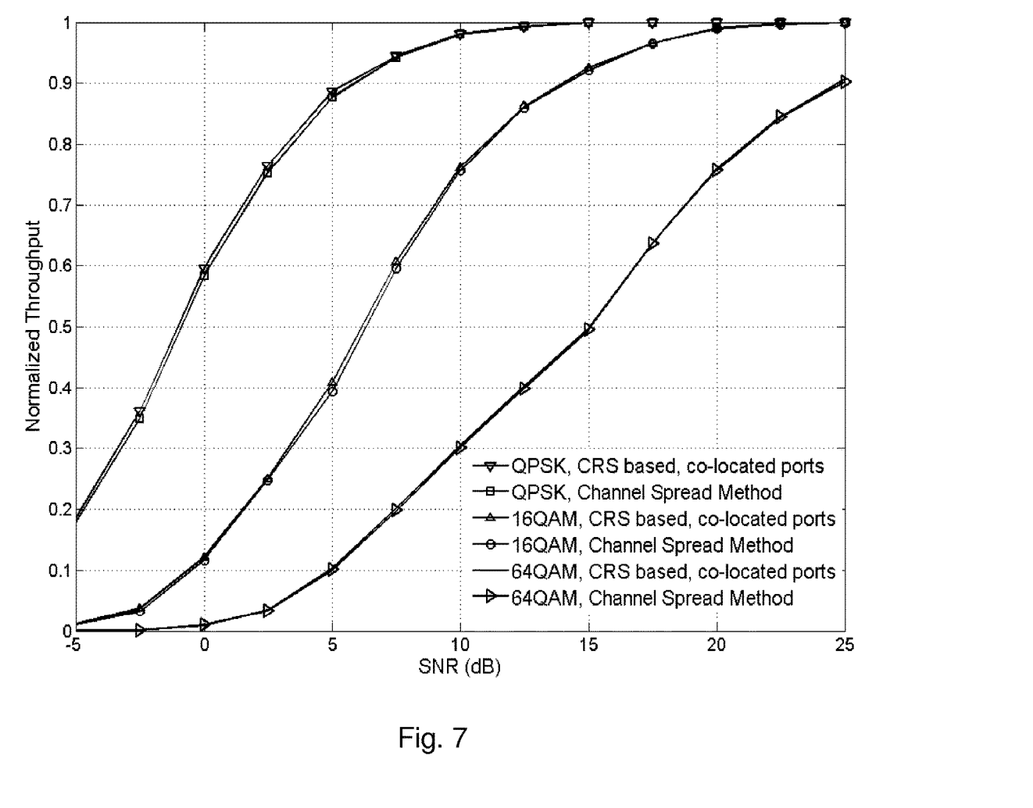
FIG. 7 illustrates normalized throughput.

A simulation study has been carried out to test the performance of the herein disclosed methods. FIG. 7 shows example resulting normalized throughput for the herein disclosed methods and for a CRS based estimation method assuming co-located ports. The normalized throughput is shown as a function of the SNR for three different modulation types. From FIG. 7 it is clear that the herein disclosed methods achieve similar performance as the CRS based method. The CRS based method assumes co-located ports and performs the channel spread estimation based on the complete bandwidth (a large set of channel estimates).

In conclusion, the herein disclosed methods have shown to produce very reliable estimates of the delay spread and the Doppler spread with a very limited number of channel estimates. The performance result of the herein disclosed methods is similar to legacy methods that require a larger number of channel estimates and more computational complexity, e.g. the use of the inverse FFT.

To summarize, estimation of a channel spread property at a receiver of a UE for one transmission antenna port p of a network node may comprise determination of channel estimates (for a limited number of pilot signals); determination of a variation of the channel estimates for resource blocks scheduled to the UE and only for channel estimates from the one transmission antenna port p; and mapping of the variation to an estimate of the channel spread property by a (pre-defined) mapping function or look-up table. The mapping of variation to a channel spread estimate may be a function of SNR. According to a first embodiment the channel spread property is delay spread, and the variation is calculated as variation over the frequency direction. According to a second embodiment the channel spread property is Doppler spread, and the variation is calculated as variation over the time direction.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of estimating channel spread at a receiver of a user equipment (UE), the channel spread characterizing a channel between the UE receiver and a first transmitting antenna port of a network node, wherein the network node comprises a plurality of transmitting antenna ports, the method being performed in the UE and comprising:
receiving symbols within scheduled subframes comprising resource blocks that are scheduled for the UE;
determining channel estimates for the channel between the UE receiver and the first transmitting antenna port, based upon the symbols received by the UE within the scheduled subframes;
selecting, from the scheduled subframes, common precoder subframes that represent subframes that are associated with a common precoder, and that are transmitted by the first transmitting antenna port;
determining a variation of the channel estimates representing the selected common precoder subframes; and
estimating the channel spread by using a pre-determined mapping from the determined variation to a channel spread value.

2. The method of claim 1, wherein the channel spread is delay spread, and wherein the variation is determined as variation over frequency of the channel estimates.

3. The method of claim 1, wherein the variation is associated with one or more frequency bands, each frequency band being associated with a range of subcarriers.

4. The method of claim 1, wherein the channel spread is Doppler spread, and wherein the variation is determined as variation over time of the channel estimates.

5. The method of claim 1, wherein the variation is determined from at least two channel estimate variations, both of the at least two channel estimate variations being associated with the selected common precoder subframes.

6. The method of claim 5, wherein the determined variation is an average of said at least two channel estimate variations.

7. The method of claim 1, wherein the mapping further is a function of signal to noise and interference ratio at the receiver for transmissions from the first transmitting antenna port.

8. The method of claim 7, wherein the signal to noise and interference ratio is determined from the channel estimates.

9. The method of claim 1, wherein the channel estimates are part of one precoding resource block group (PRG).

10. The method of claim 1, wherein the variation determination considers only those parts of the channel estimates that represent pilot symbols, wherein the pilot symbols are demodulation reference symbols (DM-RS).

11. The method of claim 1, wherein the variation is determined from at least one second order statistics determination of the channel estimates.

12. The method of claim 1 wherein the received symbols are pilot symbols and the channel estimates are determined from the pilot symbols.

13. The method of claim 1, wherein the received symbols are data transmissions and the channel estimates are determined from the data transmissions.

14. A user equipment (UE) for estimating channel spread at a receiver of the UE, the channel spread characterizing a channel between the UE receiver and a first transmitting antenna port of a network node, wherein the network node comprises a plurality of transmitting antenna ports, the UE further comprising a processing circuit configured to:
receive, via the UE receiver, symbols within scheduled subframes comprising resource blocks that are scheduled for the UE;

determine channel estimates for the channel between the UE receiver and the first transmitting antenna port, based upon the symbols received by the UE within the scheduled subframes;

select, from the scheduled subframes, common precoder subframes that represent subframes that are associated with a common precoder, and that are transmitted by the first transmitting antenna port;

determine a variation of the channel estimates representing the selected common precoder subframes; and estimate the channel spread by using a pre-determined mapping from the determined variation to a channel spread value.

15. A non-transitory computer-readable medium comprising, stored thereupon, a computer program for estimating channel spread at a receiver of a user equipment (UE), the channel spread characterizing a channel between the UE receiver and a first transmitting antenna port of a network node, wherein the network node comprises a plurality of transmitting antenna ports, the computer program comprising computer program code that, when run on the UE, causes the UE to:

receive symbols within scheduled subframes comprising resource blocks that are scheduled for the UE;

determine channel estimates for the channel between the UE receiver and the first transmitting antenna port, based upon the symbols received by the UE within the scheduled subframes;

select, from the scheduled subframes, common precoder subframes that represent subframes that are associated with a common precoder, and that are transmitted by the first transmitting antenna port;

determine a variation of the channel estimates representing the selected common precoder subframes; and estimate the channel spread by using a pre-determined mapping from the determined variation to a channel spread value.

\* \* \* \* \*